(12) United States Patent
Jenkins et al.

(10) Patent No.: US 10,513,341 B2
(45) Date of Patent: Dec. 24, 2019

(54) THRUST ALLOCATION FOR AERIAL VEHICLE

(71) Applicant: X Development LLC, Mountain View, CA (US)

(72) Inventors: Kevin Jenkins, Dixon, CA (US); Damien Jourdan, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 16/008,460

(22) Filed: Jun. 14, 2018

(65) Prior Publication Data
US 2019/0329898 A1    Oct. 31, 2019

Related U.S. Application Data

(60) Provisional application No. 62/663,503, filed on Apr. 27, 2018.

(51) Int. Cl.
*B64D 31/06* (2006.01)
*G05D 1/04* (2006.01)
(Continued)

(52) U.S. Cl.
CPC .............. *B64D 31/06* (2013.01); *G05D 1/042* (2013.01); *G05D 1/0808* (2013.01);
(Continued)

(58) Field of Classification Search
CPC ....... B64D 31/06; G05D 1/042; G05D 1/0808
(Continued)

(56) References Cited

U.S. PATENT DOCUMENTS

| 8,616,492 | B2 * | 12/2013 | Oliver ................ B64C 29/0033 244/12.4 |
| 9,663,237 | B2 | 5/2017 | Senkel et al. |

(Continued)

FOREIGN PATENT DOCUMENTS

| EP | 2595882 B1 | 6/2016 |
| EP | 2616333 B1 | 11/2016 |

(Continued)

OTHER PUBLICATIONS

International Search Report & Written Opinion for corresponding international application No. PCT/US19/028183, dated Aug. 5, 2019, 11 pages.

(Continued)

*Primary Examiner* — Yazan A Soofi
(74) *Attorney, Agent, or Firm* — Christensen O'Connor Johnson Kindness PLLC (57) ABSTRACT

A technique for controlling vertical propulsion units of an aerial vehicle includes determining whether an initial thrust command output vector results in a thrust command clipping of one of the vertical propulsion units. The vertical propulsion units are physically organized into propulsion rings including an inner ring and an outer ring. Torque associated with the initial thrust command output vector is transferred from each the vertical propulsion units in the outer ring to the vertical propulsion units in the inner ring when the thrust command clipping of one of the vertical propulsion units in the outer ring occurs. A revised thrust command output vector is determined after transferring the torque. The vertical propulsion units are driven according to the revised thrust command output vector.

21 Claims, 9 Drawing Sheets

(51) Int. Cl.
*G05D 1/08* (2006.01)
*B64C 29/00* (2006.01)
*B64C 39/02* (2006.01)

(52) U.S. Cl.
CPC ........ *B64C 29/0025* (2013.01); *B64C 39/024* (2013.01); *B64C 2201/021* (2013.01); *B64C 2201/024* (2013.01); *B64C 2201/108* (2013.01); *B64C 2201/162* (2013.01)

(58) Field of Classification Search
USPC .......................................................... 701/4
See application file for complete search history.

(56) References Cited

U.S. PATENT DOCUMENTS

| | | | |
|---|---|---|---|
| 9,677,564 B1 * | 6/2017 | Woodworth | B64C 39/024 |
| 9,856,016 B2 | 1/2018 | Mueller et al. | |
| 9,944,386 B1 * | 4/2018 | Reichert | B64C 27/08 |
| 10,086,931 B2 * | 10/2018 | Reichert | B64C 29/0025 |
| 10,207,794 B1 * | 2/2019 | Beckman | B64C 17/00 |
| 2011/0266081 A1 * | 11/2011 | Novikov-Kopp | B60V 1/08 180/120 |
| 2013/0020429 A1 | 1/2013 | Kroo | |
| 2015/0344134 A1 * | 12/2015 | Cruz Ayoroa | B64C 29/0033 244/48 |
| 2016/0001875 A1 * | 1/2016 | Daler | B64C 17/00 244/17.23 |
| 2016/0061186 A1 * | 3/2016 | Vander Lind | F03D 5/00 416/85 |
| 2016/0311528 A1 * | 10/2016 | Nemovi | B64C 27/82 |
| 2017/0106978 A1 | 4/2017 | Sopper et al. | |
| 2017/0152033 A1 | 6/2017 | Allen | |
| 2017/0240273 A1 | 8/2017 | Yuen | |
| 2017/0300065 A1 | 10/2017 | Douglas et al. | |
| 2017/0300067 A1 * | 10/2017 | Douglas | B64C 29/0025 |
| 2018/0057155 A1 | 3/2018 | Reichert et al. | |

FOREIGN PATENT DOCUMENTS

| | | |
|---|---|---|
| JP | 2014227155 A | 12/2014 |
| KR | 101772570 B1 | 9/2017 |
| WO | 2017151526 A1 | 9/2017 |
| WO | 2017184742 A1 | 10/2017 |
| WO | 2017200610 A1 | 11/2017 |

OTHER PUBLICATIONS

U.S. Appl. No. 16/008,464, entitled "Counter-Rotating Propellers for Aerial Vehicle", filed Jun. 14, 2018.
International Search Report and Written Opinion dated Aug. 29, 2019 in corresponding international application No. PCT/US2019/029005, 11 pages.

* cited by examiner

THRUST ALLOCATION FOR AERIAL VEHICLE

CROSS-REFERENCE TO RELATED APPLICATIONS

This application claims the benefit of U.S. Provisional Application No. 62/663,503, filed Apr. 27, 2018, which is hereby incorporated by reference in its entirety. The present application is also related to a U.S. Application entitled, "Counter-Rotating Propellers for Aerial Vehicle," application Ser. No. 16/008,464, filed on the same day as the present application.

TECHNICAL FIELD

This disclosure relates generally to aerial vehicles, and in particular but not exclusively, relates to control systems for vertical propulsion of aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) or drones are becoming more popular in general. As their designs are refined and their capabilities expanded, their suitability for commercial use is expected to expand. Designs that improve the efficiency, stability, reliability, and/or endurance of UAVs will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for controlling the vertical propulsion of an aerial vehicle are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein describe a control system, propulsion layout, and method of operation for vertical propulsion units of an aerial vehicle. In various embodiments, the vertical propulsion units are physically organized on the airframe in quadrants with each quadrant including two or more vertical propulsion units. The rotational directions of the propellers of each of the vertical propulsion units are selected to reduce a net yaw torque on the airframe in the event of a failure of one of vertical propulsion units. In one embodiment, this is achieved by having at least two vertical propulsion units in each quadrant that counter-rotate from each other. The per quadrant counter-rotation also serves to reduce overall yaw torque, which puts less stress on the airframe, permitting use of a lighter weight airframe.

The vertical propulsion units are further organized into propulsion rings including at least an inner ring and an outer ring. Embodiments described herein implement a saturation scheme that identifies thrust command clipping in a given ring and quickly addresses any such thrust command clipping by transferring torque to the next inner ring. In various embodiments, the saturation scheme is implemented by specifying the thrusts of the vertical propulsion units in a thrust command output vector, which is determined using an allocation matrix and a force command input vector. A flight controller quickly analyzes an initial estimate of the thrust command output vector to determine if it results in any thrust command clipping. If so, torque is sequentially transferred from the outer ring, which provides greater control effectiveness due to its greater mechanical advantage, to inner ring(s).

In various embodiments, the control system provides real-time monitoring of the effectiveness of each of the vertical propulsion units. If one or more vertical propulsion units are determined to have a failure condition, then a control effectiveness matrix may be revised mid-flight to adjust the allocation matrix and thus flight control dynamics.

Figure 1:
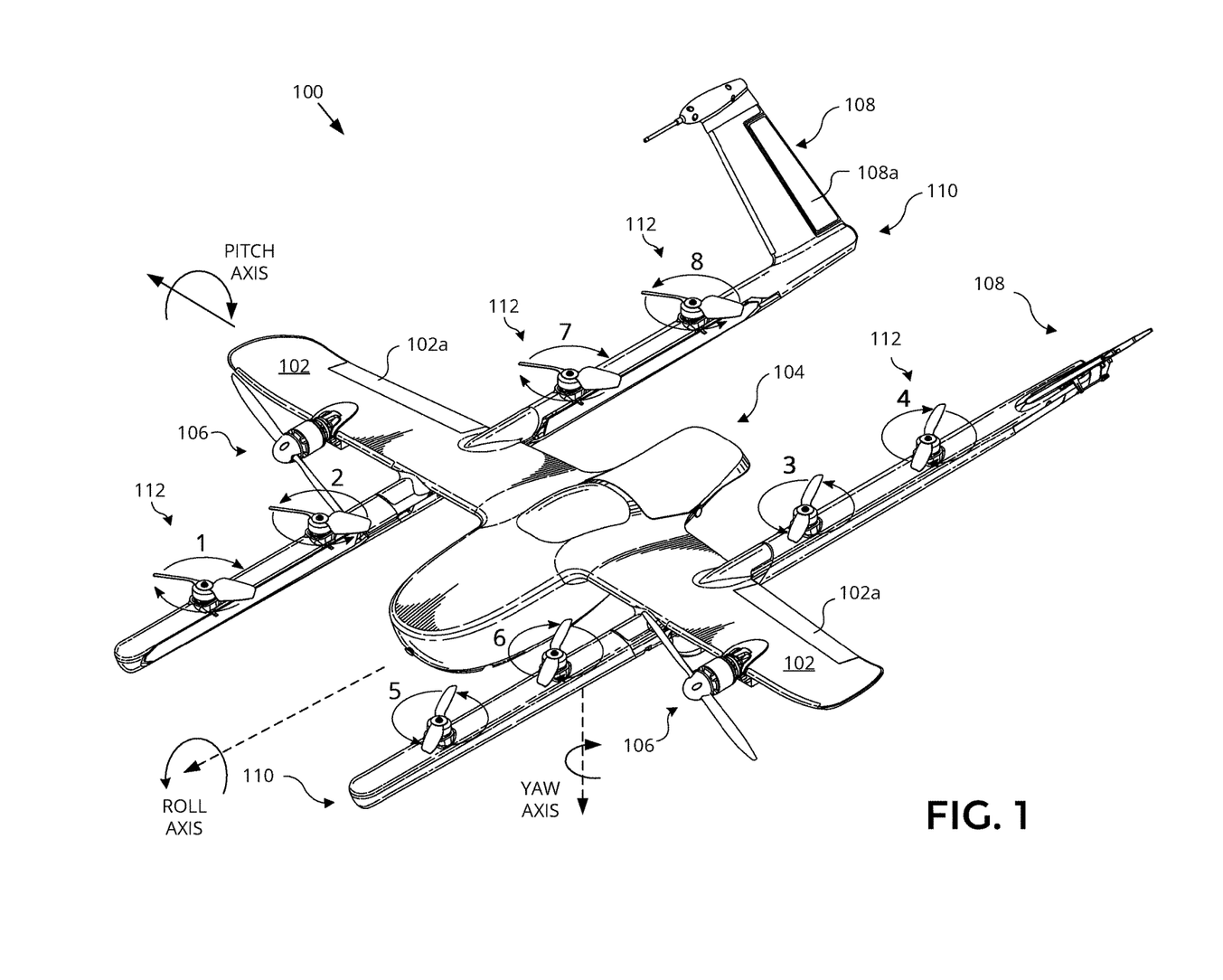
FIG. 1 is a perspective view illustration of an aerial vehicle, in accordance with an embodiment of the disclosure.

FIG. 1 is a perspective view illustration of an aerial vehicle 100, in accordance with an embodiment of the disclosure. The illustrated embodiment of aerial vehicle 100 is a vertical takeoff and landing (VTOL) unmanned aerial vehicle (UAV) that includes separate propulsion units 106 and 112 for providing horizontal and vertical propulsion, respectively. Vertical propulsion units 112 have also been labelled 1-8 for individual reference, but are collectively referred to using label 112. Aerial vehicle 100 is a fixed-wing aerial vehicle, which as the name implies, has a wing assembly 102 that can generate lift based on the wing shape and the vehicle's forward airspeed when propelled horizontally by propulsion units 106.

The illustrated embodiment of aerial vehicle 100 has an airframe that includes a fuselage 104, wing assembly 102, and boom assemblies 110. In one embodiment, fuselage 104 is modular and includes a battery module, an avionics module, and a mission payload module. These modules may be detachable from each other and mechanically securable to each other to contiguously form at least a portion of the fuselage or main body.

The battery module includes a cavity for housing one or more batteries for powering aerial vehicle 100. The avionics module houses flight control circuitry of aerial vehicle 100, which may include a processor and memory, communication electronics and antennas (e.g., cellular transceiver, wifi transceiver, etc.), and various sensors (e.g., global positioning sensor, an inertial measurement unit (IMU), a magnetic compass, etc.). The mission payload module houses equipment associated with a mission of aerial vehicle 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.).

As illustrated, aerial vehicle 100 includes horizontal propulsion units 106 positioned on wing assembly 102, which can each include a motor, a motor rotor with shaft, and propeller blades, for propelling aerial vehicle 100 horizontally. The illustrated embodiment of aerial vehicle 100 further includes two boom assemblies 110 that secure to wing assembly 102. Vertical propulsion units 112 are mounted to boom assemblies 110. Vertical propulsion units 112 can each also include a motor, a motor rotor with shaft, and propeller blades, for providing vertical propulsion. As mentioned above, vertical propulsion units 112 may be used during a hover mode where aerial vehicle 100 is descending (e.g., to a delivery location), ascending (e.g., following a delivery), or maintaining a constant altitude. Stabilizers 108 (or tails) may be included with aerial vehicle 100 to control pitch and stabilize the aerial vehicle's yaw (left or right turns) during cruise. In some embodiments, during cruise vertical propulsion units 112 are disabled and during hover horizontal propulsion units 106 are disabled. In other embodiments, vertical propulsion units 112 are merely powered low during cruise mode and/or horizontal propulsion units 106 are merely powered low during hover mode.

During flight, aerial vehicle 100 may control the direction and/or speed of its movement by controlling its pitch, roll, yaw, and/or altitude. Thrust from horizontal propulsion units 106 is used to control air speed. For example, the stabilizers 108 may include one or more rudders 108a for controlling the aerial vehicle's yaw, and wing assembly 102 may include elevators for controlling the aerial vehicle's pitch and/or ailerons 102a for controlling the aerial vehicle's roll. As another example, increasing or decreasing the speed of all the propeller blades simultaneously can result in aerial vehicle 100 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 1 and 2 illustrate one wing assembly 102, two boom assemblies 110, two horizontal propulsion units 106, and four vertical propulsion units 112 per boom assembly 110, it should be appreciated that other variants of aerial vehicle 100 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2:
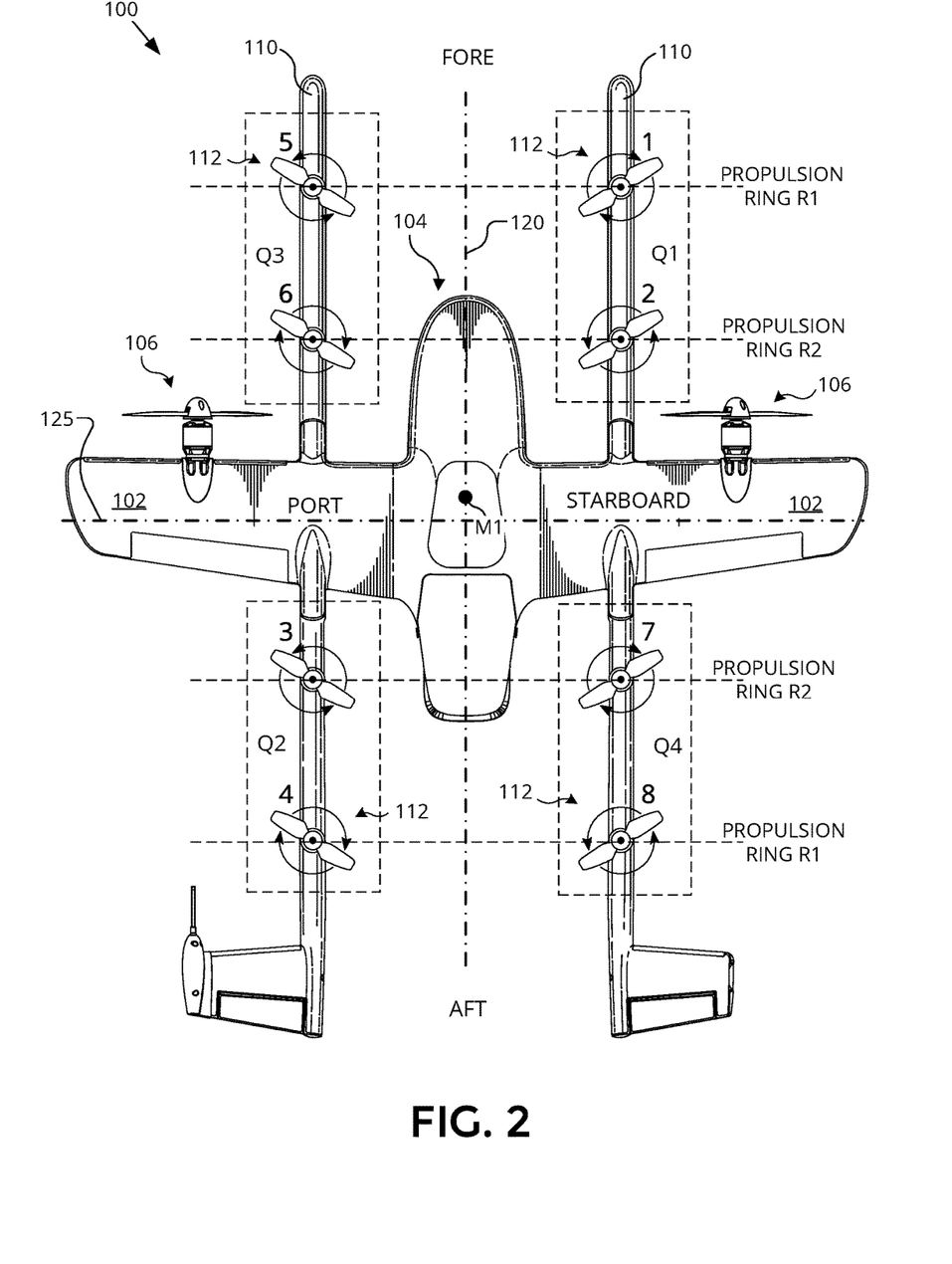
FIG. 2 is a plan view illustration of an aerial vehicle, in accordance with an embodiment of the disclosure.

FIGS. 1 and 2 illustrate a rotation scheme for the propellers of vertical propulsion units 112. Vertical propulsion units 112 are physically organized into quadrants Q1, Q2, Q3, and Q4 (see FIG. 2) about the airframe of aerial vehicle 100. Each quadrant includes two or more instances of vertical propulsion units 112, though FIGS. 1 and 2 illustrate just two vertical propulsion units 112 per quadrant. Additionally, vertical propulsion units 112 are physically organized into propulsion rings R1 and R2. Propulsion rings correlate to the distance from the center of mass M1 of aerial vehicle 100, which is also related to the mechanical advantage each vertical propulsion unit 112 has due to its physical position. FIGS. 1 and 2 illustrate just two propulsion rings R1 and R2, though other embodiments may include more than two propulsion rings (e.g., see FIG. 6).

In the illustrated embodiment, there are eight vertical propulsion units 112 individually numbered 1-8. As illustrated, propulsion units 1, 4, 6, and 7 all rotate a common directed (e.g., clockwise) while propulsion units 2, 3, 5, and 8 all counter-rotate a common direction (e.g., counterclockwise). Of course, these rotation directions can be swapped.

As illustrated, each quadrant includes at least two vertical propulsion units 112 that counter rotate relative to each other. Furthermore, those vertical propulsion units 112 physically positioned on the starboard side of aerial vehicle 100 counter-rotate during flight to a corresponding vertical propulsion unit 112 on the port side that has a mirrored position about fore-aft axis 120. For example, propulsion unit 5 counter-rotates to propulsion unit 1, propulsion unit 6 counter-rotates to propulsion unit 2, propulsion unit 3 counter-rotates to propulsion unit 7, and propulsion unit 4 counter-rotates to propulsion unit 8. Similarly, those vertical propulsion units 112 physically positioned on the fore side of aerial vehicle 100 counter-rotate during flight to a corresponding vertical propulsion unit 112 on the aft side that has a mirrored position about port-starboard axis 125. For example, propulsion unit 5 counter-rotates to propulsion unit 4, propulsion unit 1 counter-rotates to propulsion unit 8, propulsion unit 6 counter-rotates to propulsion unit 3, and propulsion unit 2 counter-rotates to propulsion unit 7. Correspondingly, diagonal propulsion units having corresponding positions that are mirrored diagonally about both fore-aft axis 120 and port-starboard axis 125 have common rotation directions. For example, propulsion unit 1 has a common rotation direction with propulsion unit 4, propulsion unit 5 has a common rotation direction with propulsion unit 8, propulsion unit 2 has a common rotation direction with propulsion unit 3, and propulsion unit 6 has a common rotation direction with propulsion unit 7. It should be appreciated that fore-aft axis 120 and port-starboard axis 125 need not (though they may) align with the center of mass M1. Furthermore, the concept of mirrored position is introduced for ease of description, but is not intended to mean the exact mirrored position, but rather an approximate position relative to the other vertical propulsion units 112.

The counter-rotation scheme illustrated in FIGS. 1 and 2 reduces the overall net yaw torque on the airframe of aerial vehicle 100 due to vertical propulsion units 112. There are two significant sources of yaw torque due to vertical propulsion units 112: (1) propeller reaction torque due to the torque from each rotating propeller and (2) thrust vectoring torque, which arises from bending or flexing of the airframe leading to off vertical axis thrust from vertical propulsion units 112. The counter rotation of vertical propeller units 112 within each quadrant significantly offsets or reduces the net yaw torque due to propeller reaction torque. During normal operation, the vertical thrusts on the airframe are well balanced leading to reduced or minimal thrust vectoring torque resulting from airframe twisting. However, when a single vertical propulsion unit 112 fails during flight, the flight dynamics are severely impacted for at least two reasons: 1) the loss of the propeller reaction torque about the yaw axis due to the failed vertical propulsion unit 112 no longer spinning; and 2) the loss of the vertical thrust provided by the failed vertical propulsion unit 112 causes the airframe to twist due to the asymmetric (unbalanced) thrusts from the remaining functioning vertical propulsion units 112. This twisting results in the thrust vectoring torque discussed above, also about the yaw axis.

Figure 3:
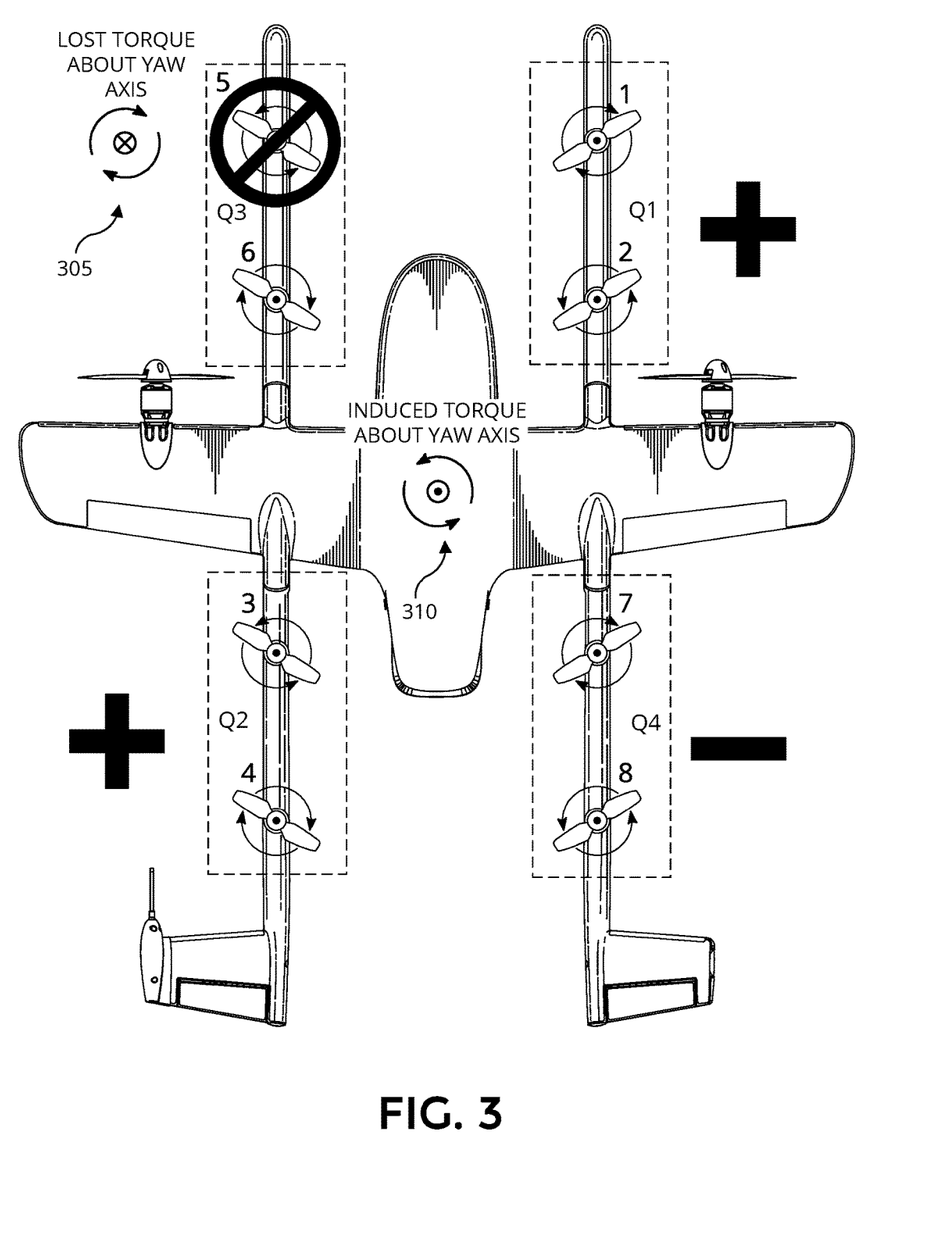
FIG. 3 is a plan view of an aerial vehicle illustrating yaw torques on the aerial vehicle upon failure of a single vertical propulsion unit, in accordance with an embodiment of the disclosure.

FIG. 3 illustrates a scenario where vertical propulsion unit 5 has failed during flight. As a result, a propeller reaction torque 305 is lost causing a net torque about the yaw axis. Additionally, the loss of the vertical thrust from vertical propulsion unit 5 causes the vertical propulsion units in quadrants Q1 and Q2 to increase thrust while vertical propulsion units in quadrant Q4 decrease thrust to compensate for this lost thrust and maintain stable flight dynamics. These unbalanced thrust forces place a twisting or bending force on the airframe, which causes the shafts and rotors of the functioning vertical propeller units 112 to slightly pitch off vertical, inducing another net torque about the yaw axis due to the thrust vectoring torque 310. However, the counter-rotation scheme illustrated in FIGS. 1-3 results in the lost propeller reaction torque 305 countering and at least partially offsetting the induced thrust vectoring torque 310.

Accordingly, the net moment about the yaw axis (yaw torque) resulting from the failure of a single vertical propulsion unit 112 is substantially reduced compared to other propeller rotation schemes or patterns. For the counter-rotation scheme/pattern illustrated in FIGS. 1-3, this offsetting benefit between the lost propeller reaction torque and the induced thrust vectoring torque always counteract regardless of which one of vertical propulsion units 112 fails. These counteracting torques reduce the overall negative impact on flight dynamics in the event of a partial or complete failure of a single vertical propulsion unit 112.

Figure 4:
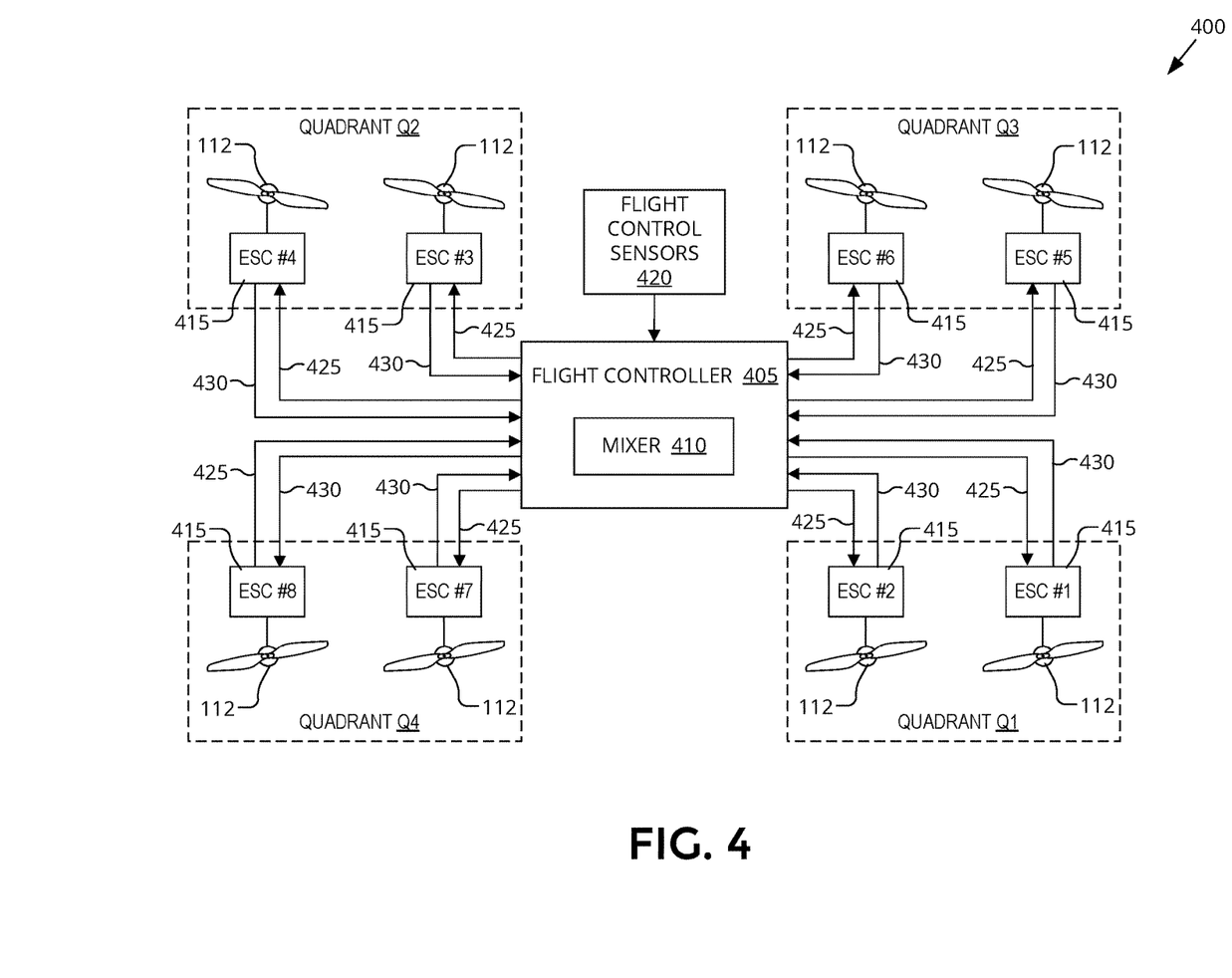
FIG. 4 is a functional block diagram illustrating a control system for vertical propulsion units of an aerial vehicle, in accordance with an embodiment of the disclosure.

FIG. 4 is a functional block diagram illustrating a control system 400 for vertical propulsion units 112 of aerial vehicle 100, in accordance with an embodiment of the disclosure. The illustrated embodiment of control system 400 includes a flight controller 405, a mixer 410, electronic speed controllers (ESCs) 415, and flight control sensors 420.

As illustrated, vertical propulsion units 112 are organized into quadrants Q1-Q4 with each quadrant including at least two vertical propulsion units 112 that counter-rotate. Flight controller 405 includes logic for coordinating and controlling the operation of the other functional components illustrated in FIG. 4 including vertical propulsion units 112 via ESCs 415. Flight controller 405 may be implemented entirely in hardware logic (e.g., application specific integrated circuit, field programmable gate array, etc.), entirely in software/firmware stored in memory and executed by a microcontroller, or a combination of both. In addition to coordinating the operation of the other functional components, flight controller 405 receives sensor input from flight control sensors 420 and along with map and/or flight route data, computes force command input vectors that specify the forces needed to steer aerial vehicle 100 along a determined direction.

The illustrated embodiment of flight controller 405 further includes mixer 410. Mixer 410 may be implemented as a software/firmware submodule of flight controller 405 or an offload engine, such as an arithmetic logic unit (ALU), for executing mathematical computations (e.g., linear algebra equations) associated with flight control equations. For example, the flight control equations take a force command input vector as input and output a thrust command output vector that specifies the thrust commands to be sent to each ESC 415 for generating a specified thrust from each vertical propulsion unit 112 thereby achieving the desired force vector on aerial vehicle 100. In one embodiment, flight controller 405 is coupled to independently control the thrust (e.g., rotation rate) of each vertical propulsion unit 112 including independently controlling vertical propulsion units 112 within a given quadrant Q1-Q4.

In the illustrated embodiment, each vertical propulsion unit 112 is coupled to a corresponding ESC 415, which controls the rotation speed of its propeller based upon a drive signal 425 from flight controller 405. Optionally, each ESC 415 may also be coupled to flight controller 405 to provide a feedback signal 430 to flight controller 405. In one embodiment, feedback signals 430 are feedback signals indicative of the operational statuses of vertical propulsion units 112. For example, feedback signals 430 may indicate one or more of rotational speed (e.g., rpms, etc.) of the propeller, power consumption of the motor, current through the motor, motor resistance, or otherwise. In one embodiment, feedback signals 430 are feedback signals from internal operation of ESCs 415. In one embodiment, feedback signals 430 are output signals from sensors disposed in, on, or adjacent to vertical propulsion units 112 which monitor the real-time operation of vertical propulsion units 112 and provide real-time feedback to flight controller 405. For example, such sensors may include a rotational encoder, a Hall Effect sensor, an optical sensor, a magnetic sensor, a current sensor, or otherwise.

The illustrated embodiment of control system 400 also includes flight control sensors 420 coupled to flight controller 405 to provide various other operational feedback for controlling flight dynamics of aerial vehicle 100. For example, flight control sensor 420 may include one or more of an accelerometer, a gyroscope, a magnetometer, an inertial measurement unit (IMU), a global positioning system (GPS) receiver, or other operational sensors.

Figure 5:
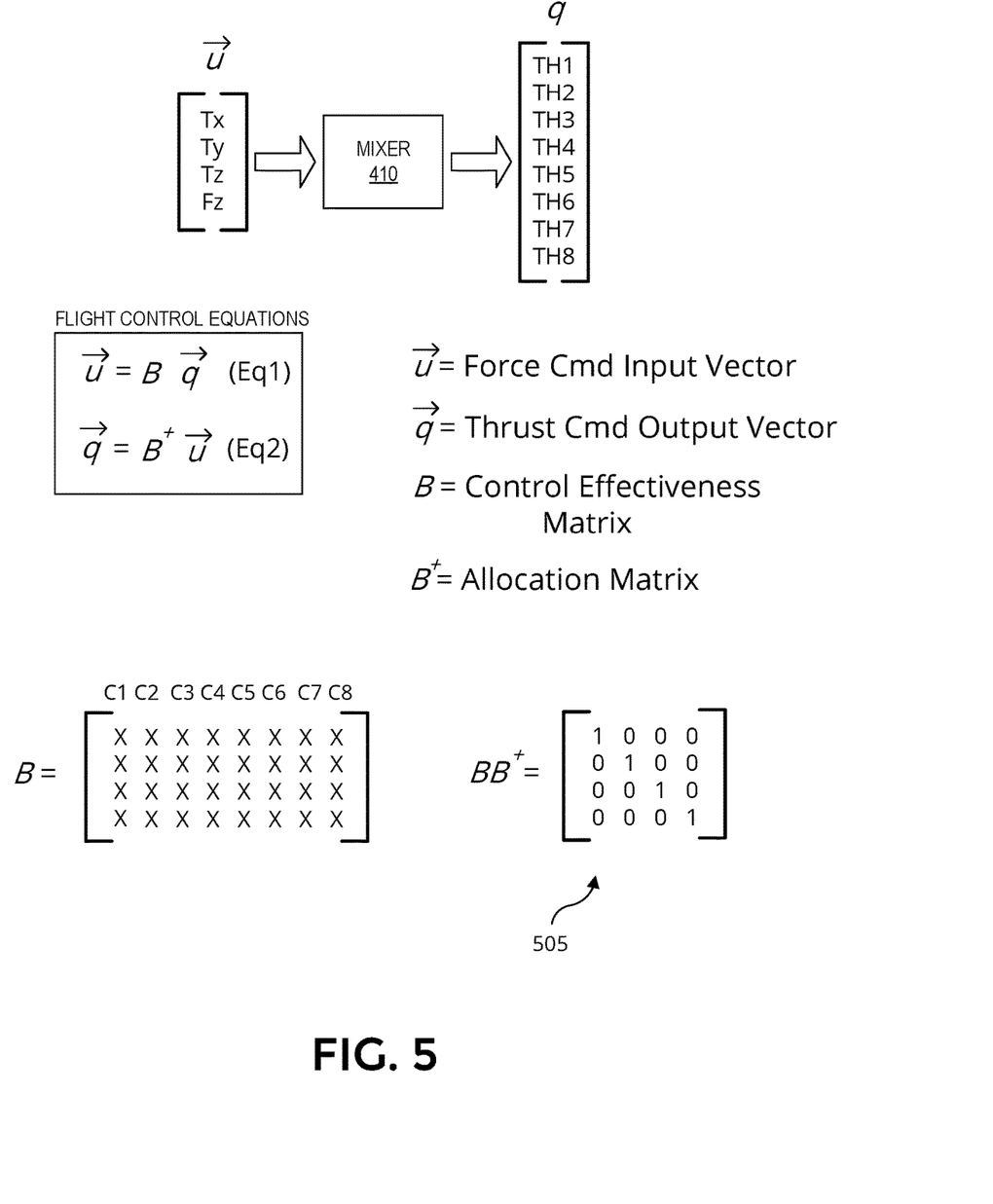
FIG. 5 illustrates flight control equations executed by the control system of the aerial vehicle, in accordance with an embodiment of the disclosure.

FIG. 5 illustrates the flight control equations executed by control system 400 in general and mixer 410 in particular, in accordance with an embodiment of the disclosure. In one embodiment, flight controller 405 determines a force command input vector u, which specifies the torques Tx, Ty, and Tz about the x, y, and z axes along with a linear force along the z axis. The force command input vector u represents the desired forces to be applied to the airframe of aerial vehicle 100 by vertical propulsion units 112. The force command input vector u is computed by flight controller 405 with reference to feedback signals from flight control sensors 420 along with map/route data.

The force command input vector u is provided to mixer 410 as an input. Mixer 410 uses the force command input vector u to generate a thrust command output vector q, which specifies the thrust commands to be applied to the individual vertical propulsion units 112 by their corresponding ESCs 415. For the illustrated embodiment, the thrust command output vector q is an eight variable vector with each variable specifying the thrust or thrust command of a corresponding one of the eight vertical propulsion units 112.

Mixer 410 determines the thrust command output vector q based upon the force command input vector u and an allocation matrix $B^+$ using equation (Eq2). In one embodiment, the allocation matrix $B^+$ is a least squares solution matrix (i.e., minimization of the sum of squares), such as the Moore-Penrose Pseudoinverse (MPPI). Of course, other general solution strategies other than a least squares approach may be used and other specific least squares solutions other than the MPPI may be used as well. Solving for a least squares solution provides an acceptable tradeoff between computational resources needed to achieve a timely solution and accuracy or precision of the solution.

The allocation matrix $B^+$ is determined based upon a control effectiveness matrix B. The allocation matrix $B^+$ is related to the control effectiveness matrix B via an identity matrix (see equation 505 in FIG. 5). The control effectiveness matrix B specifies the operational effectiveness of each vertical propulsion unit 112 in effecting a flight dynamic change on aerial vehicle 100. Each column C1-C8 corresponds to one of vertical propulsion units 112 and specifies that unit's effectiveness. For example, vertical propulsion units 112 that reside on an outer propulsion ring (e.g., ring R1), generally have greater mechanical advantage due to a longer lever arm from the center of mass M1 and therefore are generally more effective at inducing a rotational moment on aerial vehicle 100. As such, vertical propulsion units 112 physically residing along an outer propulsion ring will have higher effectiveness values in their columns compared to vertical propulsion units 112 residing along an inner propulsion ring. Of course, the size and form factor of each propeller along with motor strength of each vertical propulsion unit 112 can also be accounted for in control effectiveness matrix B.

Similarly, if a given vertical propulsion unit 112 is experiencing a failure condition, then the column of control effectiveness matrix B associated with the failing unit may be updated in real-time (e.g., mid-flight) to reflective its current status. For example, if the failing unit is determine to be capable of 50% thrust, then the values in its column may be scaled by 50%. If the failing unit is determined to be entirely not functioning, then the values in its column may be scaled to zero. Once the control effectiveness matrix is updated due to a determined failure condition, a new allocation matrix $B^+$ may be recomputed by mixer 410 using equation 505 to compute a revised thrust command output vector q for a given force command input vector u.

Figure 6:
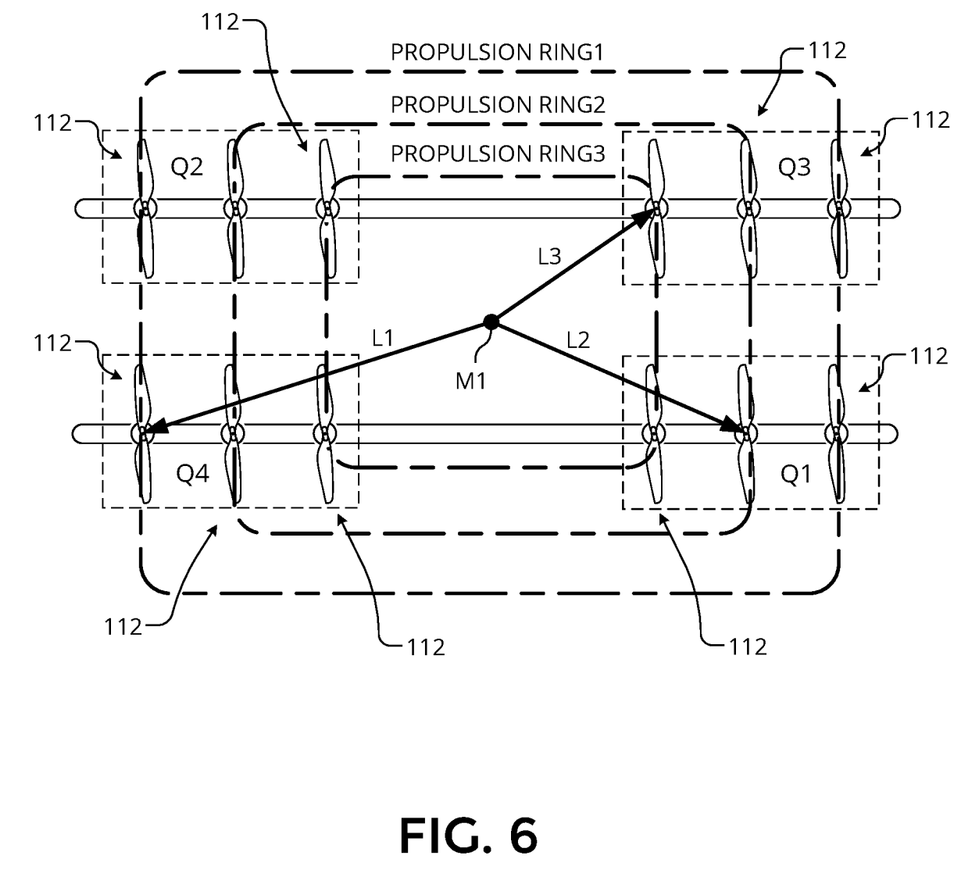
FIG. 6 illustrates how the propulsion rings of an aerial vehicle have different effective lever arms, in accordance with an embodiment of the disclosure.

FIG. 6 illustrates how the propulsion rings of an aerial vehicle have different effective lever arms, in accordance with an embodiment of the disclosure. In the illustrated embodiment, there are twelve vertical propulsion units 112 physically organized into four quadrants Q1-Q4 with each quadrant include three vertical propulsion units 112. Vertical propulsion units 112 are also physically organized into three propulsion rings R1, R2, and R3. Propulsion rings R1-R3 correspond to physical positions for vertical propulsion units 112 that have different control effectiveness due to their variable mechanical advantage. The variable mechanical advantage stems from the variable length lever arms L1, L2, and L3 from the center of mass M1 of the aerial vehicle. Aerial vehicle 100 may be implemented with the three propulsion rings as illustrated in FIG. 6. Of course, in other embodiments, more than three propulsion rings may be used.

Figure 7:
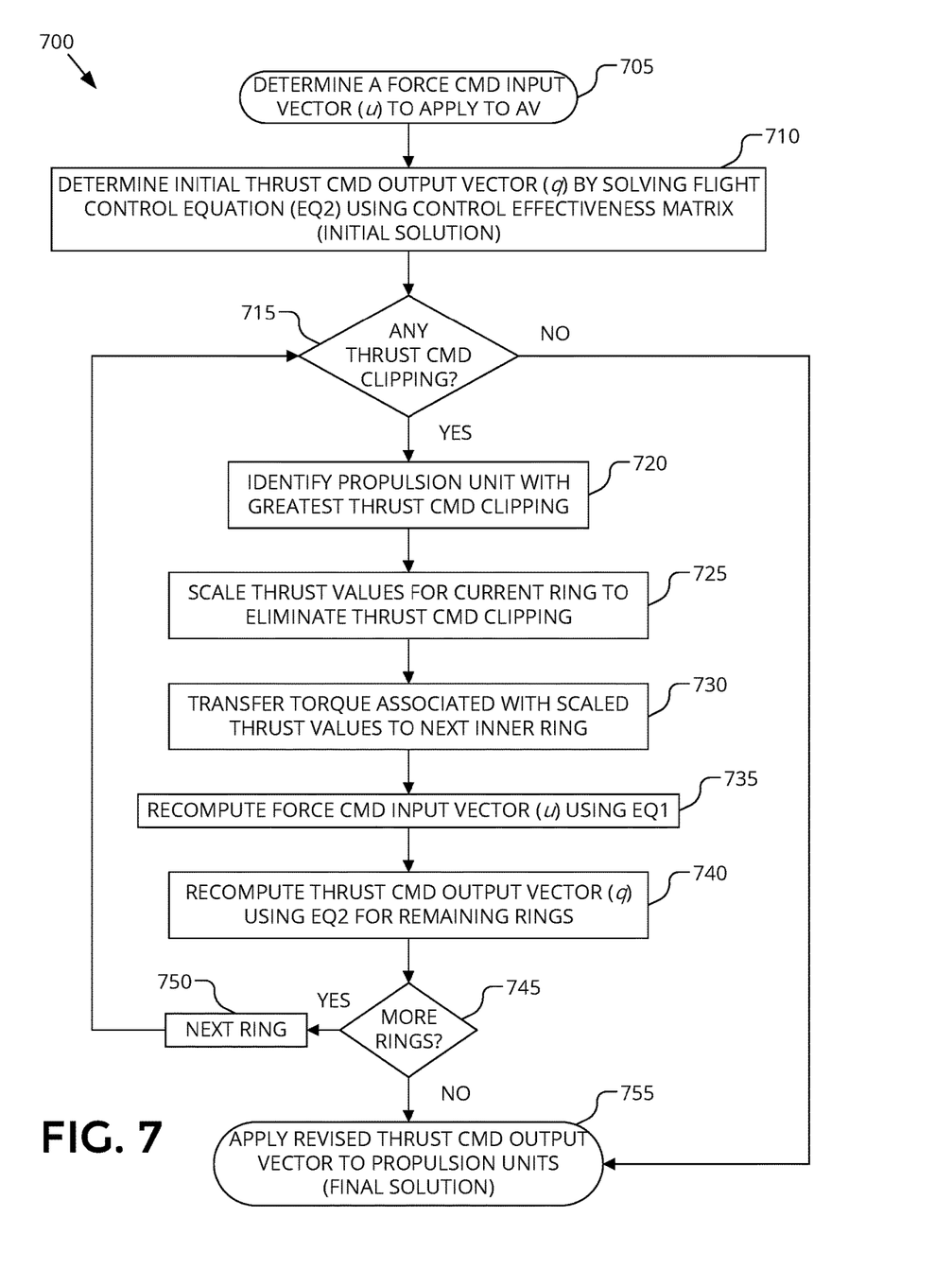
FIG. 7 is a flow chart illustrating operation of a control system for vertical propulsion units, in accordance with an embodiment of the disclosure.

FIG. 7 is a flow chart illustrating a process 700 for operation of control system 400, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

Process 700 describes a saturation redistribution scheme that quickly and efficiently reallocates torque and thrust from outer propulsion rings to inner propulsion rings when the initial control solution provided by the flight control equations (Eq1 and Eq2) results in thrust command clipping for one or more vertical propulsion units in a given propulsion ring. Thrust command clipping results when a thrust command (e.g., one of the variables of the thrust command output vector q) requests an amount of thrust from a given vertical propulsion unit that would saturate the vertical propulsion unit. These thrust commands are clipped by the ESC since they are not achievable by the vertical propulsion unit. Thrust command clipping may also be referred to as thrust clipping.

In a process block 700, flight controller 405 determines a force command input vector u to apply to aerial vehicle 100 to achieve a desired flight dynamic. The force command input vector u describes rotational torques Tx, Ty, and Tz along with vertical force Fz to be applied collectively by vertical propulsion units 112 to the airframe of aerial vehicle 100.

In a process block 710, an initial thrust command output vector $q_1$ is determined by flight controller 405. In one embodiment, the force command input vector u is provided to mixer 410, which solves equation Eq2 using the allocation matrix $B^+$ to calculate the initial thrust command output vector $q_1$. The initial thrust command output vector $q_1$ represents an initial solution or estimate of the thrust commands to be sent to each ESC 415 for driving vertical propulsion units 112. The initial thrust command output vector $q_1$ may also be considered an unbounded solution, which means it may include thrust commands that result in thrust clipping.

In a decision block 715, flight controller 405 determines whether the initial thrust command output vector $q_1$ would result in any thrust command clipping. If not, then process 700 continues to a process block 755 where the thrust commands of the initial thrust command output vector $q_1$ are sent to ESCs 415 to drive vertical propulsion units 112 as the final solution. However, if the initial thrust command output vector $q_1$ would result in thrust command clipping of one of the vertical propulsion units 112, then process 700 continues to a process block 720. In process block 720, the propulsion unit with the greatest thrust command clipping in the outer propulsion ring R1 is identified.

Figure 8A:
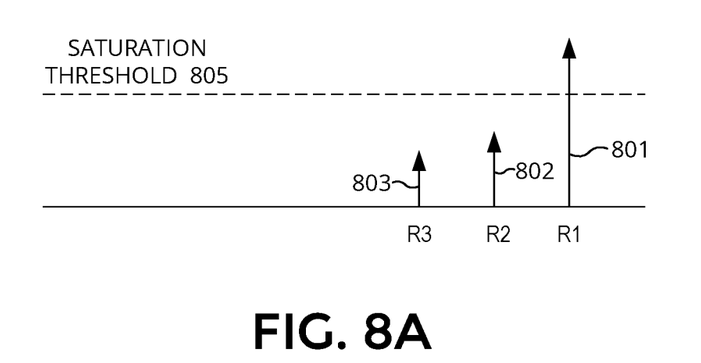
FIGS. 8A-C illustrate the transferring of thrust from outer propulsion rings to inner propulsion rings, in accordance with an embodiment of the disclosure.

FIG. 8A illustrates the initial thrust commands 801, 802, and 803 for vertical propulsion units 112 within a given quadrant (e.g., Q1) for a three propulsion ring implementation as illustrated in FIG. 6. As illustrated, the initial thrust command 801 for the vertical propulsion unit 112 in propulsion ring R1 of quadrant Q1 exceeds saturation threshold 805 for the vertical propulsion units. Accordingly, in a process block 725, the thrust values for all vertical propulsion units 112 in propulsion ring R1 across all quadrants are scaled by an amount that drops the thrust command for the propulsion unit with the greatest clipping below saturation threshold 805.

Figure 8B:
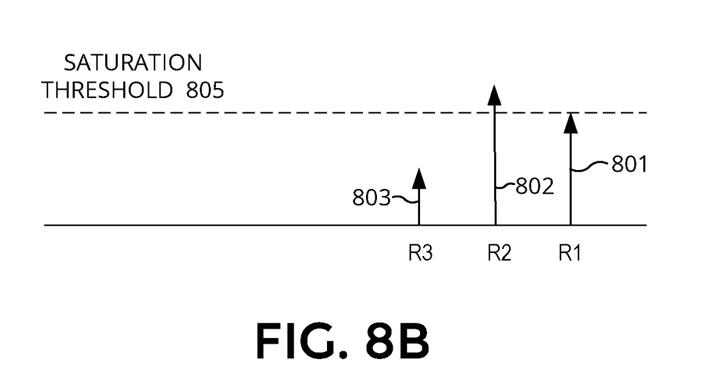

In a process block 730, the torque is transferred from the vertical propulsion units 112 in the outer propulsion ring R1 to the next inner propulsion ring R2. The amount of torque transferred is equal to the amount of torque reduced from the outer ring R1 due to scaling all thrust commands or thrust values of the vertical propulsion units 112 in outer ring R1. FIG. 8B illustrates the scaling of thrust command 801 associated with just the one vertical propulsion unit 112 in propulsion ring R1 of quadrant Q1. As illustrated, some of the transferred torque is transferred to thrust command 802.

Figure 8C:
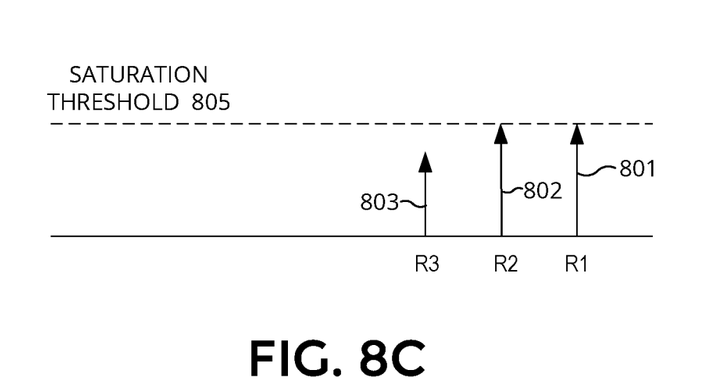

In a process block 735, the force command input vector u is recomputed by flight controller 405 using flight control equation Eq1 and the scaled thrust command values. The outer ring thrust command values are held constant after scaling while the inner ring thrust command values are recomputed. In a process block 740, a revised thrust command output vector q is recomputed using flight control equation Eq2 for the remaining inner rings while the thrust values for outer propulsion rings already scaled are fixed. In a decision block 745, process 700 loops back to decision block 715 and re-executes for the next inner propulsion ring (process block 750). FIG. 8C illustrates the thrust values for all vertical propulsion units 112 in quadrant Q1 after successively transferring torque inward from propulsion rings R1 and R2.

Once all propulsion rings have been analyzed (decision block 745), process 700 continues to a process block 755 where the final revised thrust command output vector is sent to ESCs 415 for driving vertical propulsion units 112.

Figure 9:
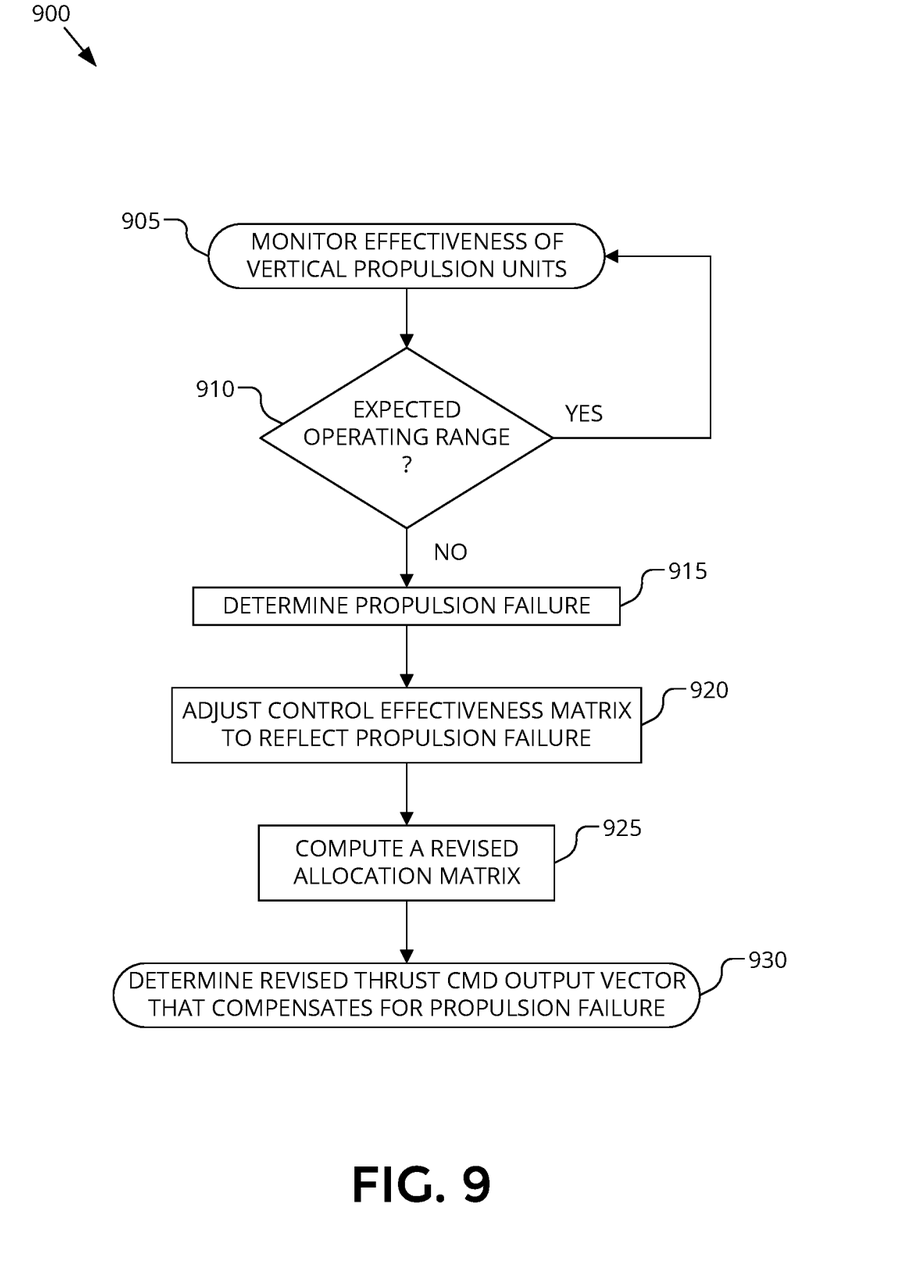
FIG. 9 is a flow chart illustrating operation of a control system to identify and react to a propulsion failure, in accordance with an embodiment of the disclosure.

FIG. 9 is a flow chart illustrating a process 900 for identifying and reacting to a propulsion failure, in accordance with an embodiment of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In a process block 905, the effectiveness of vertical propulsion units 112 is monitored by flight controller 405. In one embodiment, the effectiveness is monitored in real-time via one or more techniques. For example, the drive signals 425 sent to ESCs 415 and/or the feedback signals 430 received from ESCs 415 may be monitored. The drive signals 425 may be the thrust commands used to drive vertical propulsion units 112 while the feedback signals 430 may be current signals or other operational feedback from vertical propulsion units 112. Drive signals 425 and/or the feedback signals 430 are monitored for deviations from expected operating ranges. If a deviation persists for a threshold period of time (decision block 910), then flight controller 405 determines that a failure condition is occurring (process block 915).

The determination of a failure condition need not only be a 100% failure condition (i.e., the associated vertical propulsion unit 112 is not providing any thrust), but may also including partial failure conditions where the vertical propulsion unit 112 is providing some thrust. Failure conditions, along with their severity, may be further identified and determined with reference to flight control sensors 420. For example, if a thrust command to a given vertical propulsion unit 112 is expected to result in a change in flight dynamics (e.g., change in pitch, yaw, etc.) but does not or merely achieves a partial or reduced change, then feedback from flight control sensors 420 along with drive signals 425 and/or feedback signals 430 may be analyzed to characterize the type and degree of the failure condition.

In response to determining a propulsion failure, flight controller 920 adjusts the control effectiveness matrix B to reflect the propulsion failure (process block 920). Referring to FIG. 5, if vertical propulsion unit 5 is determined to be 50% operational, then the values in column C5 may be scaled by 0.5 to reflect the reduced effectiveness of vertical propulsion unit 5. Once the control effectiveness matrix B is updated, a revised allocation matrix $B^+$ is recomputed by solving equation 505 (process block 925). Finally, a revised thrust command output vector q is computed by mixer 410 using equation Eq2. The revised thrust command output vector q is then used to drive vertical propulsion units 112 in a manner that compensates for, or otherwise takes into account, the failure condition.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An aerial vehicle, comprising:
   an airframe;
   vertical propulsion units mounted to the airframe to provide vertical propulsion and physically organized into propulsion rings including at least an inner ring and an outer ring;
   a flight controller including logic that when executed by flight controller causes the aerial vehicle to perform operations including:
      determining whether an initial thrust command output vector results in a thrust command clipping of one of the vertical propulsion units;
      transferring torque associated with the initial thrust command output vector from each the vertical propulsion units in the outer ring to the vertical propulsion units in the inner ring when the thrust command clipping of one of the vertical propulsion units in the outer ring occurs;
      determining a revised thrust command output vector after transferring the torque; and
      driving the vertical propulsion units according to the revised thrust command output vector.

2. The aerial vehicle of claim 1, wherein the flight controller includes further logic that when executed by the flight controller causes the aerial vehicle to perform further operations including:
   scaling first thrust values associated with all of the vertical propulsion units in the outer ring when the thrust command clipping of one of the vertical propulsion units in the outer ring is determined,
   wherein the torque transferred from the outer ring to the inner ring comprises an amount of torque reduced from the outer ring due to scaling all of the vertical propulsion units in the outer ring.

3. The aerial vehicle of claim 2, wherein the flight controller includes further logic that when executed by the flight controller causes the aerial vehicle to perform further operations including:
   identifying which of the vertical propulsion units in the outer ring has a greatest amount of the thrust command clipping due to the initial thrust command output vector,
   wherein all of the first thrust values of the vertical propulsion units in the outer ring are scaled based upon the greatest amount of the thrust command clipping.

4. The aerial vehicle of claim 2, wherein the flight controller includes further logic that when executed by the flight controller causes the aerial vehicle to perform further operations including:
   recomputing second thrust values of the initial thrust command output vector associated with the inner ring after transferring the torque from the outer ring to the inner ring, wherein the first thrust values of the outer ring are fixed after the scaling and while recomputing the second thrust values of the inner ring.

5. The aerial vehicle of claim 1, wherein the flight controller includes further logic that when executed by the flight controller causes the aerial vehicle to perform further operations including:
   determining the initial thrust command output vector,
   wherein the initial thrust command output vector and the revised thrust command output vector are determined by solving for least squares solutions.

6. The aerial vehicle of claim 5, wherein the initial thrust command output vector and the revised thrust command output vector are determined by applying a Moore-Penrose Pseudoinverse allocation matrix to force command input vectors.

7. The aerial vehicle of claim 1, wherein the vertical propulsion units in the outer ring have greater mechanical advantage due to a longer lever arm to a center of mass the aerial vehicle than the vertical propulsion units in the inner ring.

8. The aerial vehicle of claim 1, wherein the flight controller includes logic that when executed by the flight controller causes the aerial vehicle to perform operations including:
   monitoring an effectiveness of each of the vertical propulsion units in real-time;
   identifying when the effectiveness of a given one of the vertical propulsion units falls outside of an expected operating range;
   adjusting a control effectiveness matrix to reflect a reduced effectiveness for the given one of the vertical propulsion units when the effectiveness is identified as falling outside of the expected operating range; and
   revising a current thrust command output vector for controlling the vertical propulsion units based upon the control effectiveness matrix after the adjusting.

9. The aerial vehicle of claim 8, wherein monitoring the effectiveness of each of the vertical propulsion units comprises monitoring drive signals to the vertical propulsion units.

10. The aerial vehicle of claim 8, further comprising:
    operational sensors positioned in, on, or adjacent to the vertical propulsion units that monitor operation of the vertical propulsion units, wherein monitoring the effectiveness of each of the vertical propulsion units comprises monitoring feedback signals from the operational sensors.

11. The aerial vehicle of claim 1, wherein the aerial vehicle comprises an unmanned aerial vehicle (UAV) having two or more of the vertical propulsion units physically positioned in each of four quadrants of the airframe and wherein each of the four quadrants also includes first and second vertical propulsion units associated with the outer ring and the inner ring, respectively.

12. A method of controlling vertical propulsion units of an aerial vehicle, the method comprising:
determining whether an initial thrust command output vector results in a thrust command clipping of one of the vertical propulsion units, wherein the vertical propulsion units are physically organized into propulsion rings including an inner ring and an outer ring;
transferring torque associated with the initial thrust command output vector from each the vertical propulsion units in the outer ring to the vertical propulsion units in the inner ring when the thrust command clipping of one of the vertical propulsion units in the outer ring occurs;
determining a revised thrust command output vector after transferring the torque; and
driving the vertical propulsion units according to the revised thrust command output vector.

13. The method of claim 12, further including:
scaling first thrust values associated with all of the vertical propulsion units in the outer ring when the thrust command clipping of one of the vertical propulsion units in the outer ring is determined,
wherein the torque transferred from the outer ring to the inner ring comprises an amount of torque reduced from the outer ring due to scaling all of the vertical propulsion units in the outer ring.

14. The method of claim 13, further including:
identifying which of the vertical propulsion units in the outer ring has a greatest amount of the thrust command clipping due to the initial thrust command output vector,
wherein all of the first thrust values of the vertical propulsion units in the outer ring are scaled based upon the greatest amount of the thrust command clipping.

15. The method of claim 13, further including:
re-computing second thrust values of the initial thrust command output vector associated with the inner ring after transferring the torque from the outer ring to the inner ring, wherein the first thrust values of the outer ring are fixed after the scaling and while re-computing the second thrust values of the inner ring.

16. The method of claim 12, further including:
determining the initial thrust command output vector,
wherein the initial thrust command output vector and the revised thrust command output vector are determined by solving for least squares solutions.

17. The method of claim 16, wherein the initial thrust command output vector and the revised thrust command output vector are determined by applying a Moore-Penrose Pseudoinverse allocation matrix to force command input vectors.

18. The method of claim 12, wherein the vertical propulsion units in the outer ring have greater mechanical advantage due to a longer lever arm to a center of mass the aerial vehicle than the vertical propulsion units in the inner ring.

19. The method of claim 12, further including:
monitoring an effectiveness of each of the vertical propulsion units in real-time;
identifying when the effectiveness of a given one of the vertical propulsion units falls outside of an expected operating range;
adjusting a control effectiveness matrix to reflect a reduced effectiveness for the given one of the vertical propulsion units when the effectiveness is identified as falling outside of the expected operating range; and
revising a current thrust command output vector for controlling the vertical propulsion units based upon the control effectiveness matrix after the adjusting.

20. The method of claim 19, wherein monitoring the effectiveness of each of the vertical propulsion units comprises monitoring drive signals to the vertical propulsion units.

21. The method of claim 19, wherein the aerial vehicle includes operational sensors that monitor operation of the vertical propulsion units, and wherein monitoring the effectiveness of each of the vertical propulsion units comprises monitoring feedback signals from the operational sensors.

* * * * *